Sept. 22, 1942.    G. J. HUEBNER, JR    2,296,642
POWER TRANSMISSION
Filed March 13, 1941
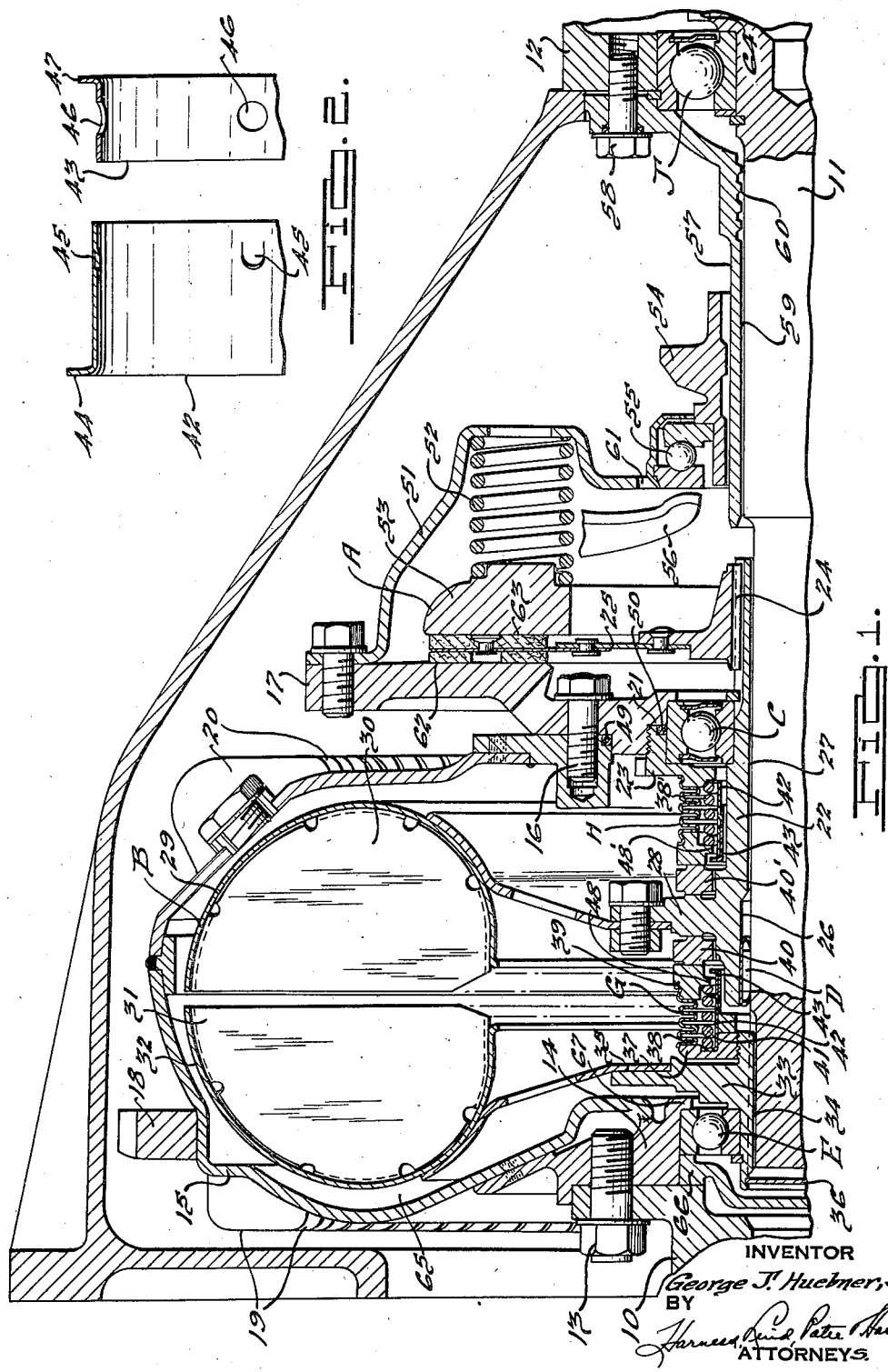
INVENTOR
George J. Huebner, Jr.
BY
Harness, Dick, Pater, Harris
ATTORNEYS Patented Sept. 22, 1942

2,296,642

UNITED STATES PATENT OFFICE 2,296,642

POWER TRANSMISSION

George J. Huebner, Jr., Detroit, Mich., assignor to Chrysler Corporation, Highland Park, Mich., a corporation of Delaware Application March 13, 1941, Serial No. 383,193

12 Claims. (Cl. 192—3.2)

This invention relates to motor vehicles and refers more particularly to improvements in power transmission for driving motor vehicles.

One object of my invention is to provide an improved system of power transmission of the type embodying a fluid coupling of the kinetic type which transmits the drive from the engine to the vehicle under control of a clutch operable to release or establish the drive between the engine and transmission or other mechanism receiving the drive from the fluid coupling.

In practice I preferably locate the clutch in the drive functionally between the engine and the fluid coupling, the coupling being located in the drive functionally between the clutch and transmission. The physical location of the clutch is, by preference, disposed between the fluid coupling and transmission thereby utilizing the mass of the coupling housing for flywheel purposes. With my arrangement the flywheel mass effective under idling conditions is materially increased, in comparison with past practice, by the addition of the clutch housing mass without, however, increasing the total weight of material, or momentum, under driving conditions. In this and other respects my invention constitutes an improvement over the driving system embodied in the patent to Phelan et al., No. 2,182,407 of December 5, 1939.

One outstanding advantage of disposing the clutch functionally between the engine and coupling is that when it is engaged sharply, no torque reaction is transmitted to the transmission and other vehicle parts receiving the drive from the coupling, except through the coupling wherein the torque impulses are cushioned by the fluid medium in the coupling. Such arrangement affords improved smoothness of operation and protection of the driving mechanism of the vehicle.

In locating the clutch behind the fluid coupling, assuming a conventional rear wheel drive vehicle, but functionally between the engine and coupling, considerable difficulty is experienced in providing desired relationships from the standpoint of adequate bearing supports, freedom from binding of the various parts, maintaining running balance of the parts, and arranging the parts so that they do not require more room than is conveniently available for the assembly as a whole.

It is accordingly an object of my invention to provide a drive system incorporating the foregoing desirable characteristics while being free from the undesirable properties.

A further object is to provide an improved arrangement of the type aforesaid wherein the coupling and clutch parts will not tend to bind or result in an out of balance condition even where minor misalignment of the crankshaft and transmission bearings occurs. These problems are aggravated by the use of a clutch of the conventional friction dry-plate commercial type which is quite massive and introduces further problems of deflections in the supporting means, out of balance tendencies, and other difficulties.

Further objects and advantages of my invention will be more apparent as this specification progresses, reference being made to the embodiment of my invention shown in the accompanying drawing in which:

Fig. 1 is a longitudinal sectional elevational view of the coupling and clutch.

Fig. 2 is a fragmentary sectional view of the seal retainer prior to assembly.

Referring to the drawing, reference character 10 represents the rear end of the engine crankshaft which is the driving shaft for the power transmission system, the crankshaft being adapted to transmit the drive through a clutch A which, for the most part, may be of any suitable type such as the ordinary commercial clutch illustrated. This clutch is arranged to transmit the drive through a fluid coupling B whereby the drive is then transmitted to the transmission input shaft 11 which preferably leads to any suitable type of speed ratio changing mechanism in fixed casing 12 as in the aforesaid Phelan et al. patent or, if preferred, directly to the usual rear vehicle ground wheels of the vehicle through the conventional rear axle and differential mechanism (not shown). The input shaft 11 is the output shaft of the power transmitting system shown in Fig. 1.

The parts of the fluid coupling B are, for the most part, formed of stampings welded together thereby avoiding special fastening devices and imparting the desired rigidity and strength to the assemblies. Secured to the rear end of crankshaft 10 by fasteners 13, I have provided a supporting journalling member 14 of a stamped housing or shrouding 15 which is welded to member 14 and which extends around or bridges the coupling B in spaced relation therewith and has its rear portion extending radially inwardly for connection at 16 with the flywheel-like driving member 17 of clutch A. The shrouding 15 carries the engine starter ring gear 18 and may be provided with cooling fins 19, 20.

The driving member 17 has an inner annular hub 21 for mounting the outer race of an antifriction ball bearing journalling assembly C, the inner race fitting a hollow hub or shaft 22. In the present instance a ring 23 has threaded connection with hub 21 and supplements the same in receiving the outer race of bearing C. The rear end of hub 22 is splined at 24 for connection with the driven plate assembly 25 of clutch A such that this plate lies rearwardly adjacent bearing C. The front end of hub 22 is internally enlarged at 26 to receive an antifriction journal bearing assembly D of commercial form, this bearing journalling the front end of hub 22 on shaft 11 whereas portions of this hub rearwardly of this bearing have a clearance 27 with shaft 11.

The front end portion of hollow hub 22 is formed with an annular flange 28 for mounting thereon the impeller structure 29 of coupling B, this impeller having the usual radially extending vanes 30 for directing the fluid medium by the action of centrifugal force toward corresponding vanes 31 of the runner structure 32 whereby to transmit the drive from the impeller to the runner in the well known manner. The impeller 29 is spaced from and lies within the shrouding 15.

The supporting member 14 carries the outer race of the anti-friction ball bearing journalling assembly E, the inner race mounting a hub 33 having splined connection at 34 with the front end portion of shaft 11. This hub 33 mounts the runner 32 as by welding connection therewith at 35. The front end of hub 33 is sealed fluid-tight by a plug 36.

I preferably seal the parts against escape of fluid rearwardly of the coupling by a pair of bellows-type sealing assemblies G and H. The seal G comprises an abutment 37 mounted on hub 33 and having brazed or welded thereto the bellows 38 the rear end of which carries a thrust ring 39 running against a sealing ring 40 which, in turn, bears against a suitably formed sealing face of flange 28. A spring 41 acts between fixed abutment 37 and ring 39 to maintain the latter under yielding thrust rearwardly thereby to prevent fluid escape inwardly between the engagement of ring 40 with ring 39 and flange 28.

Likewise the seal H is provided with an identical sealing ring 40' yieldingly thrust toward flange 28, the bellows 38' in this instance having its rear end fixed to the ring 23. In order to facilitate the handling of each seal assembly G and H and to facilitate the assembly thereof without unduly expanding spring 41, I provide an annular cage (Fig. 2) comprising stamped parts 42, 43.

For seal G the part 42 has its flange 44 engaged with and preferably secured to abutment 37, this part 42 having a series of deflected spring torques 45. The part 43 slides forwardly within part 42 and has openings 46 into which the tongues 45 snap and then hold parts 42, 43 together. Prior to assembly, the flange 47 of part 43 is engaged by the flanged spring seat 48 of ring 39 to limit separation of ring 39 from abutment 37 by spring 41. When assembled, the seat 48 moves away from flange 47 as spring 41 is compressed but on removal of the seal G for any reason, the flange 47 will again act to hold the seal parts assembled. A similar arrangement is provided for seal H in cooperation with the flanged seat 48'. If desired, further seals of ordinary ring type may be installed at 49, 50 where the parts are fabricated as illustrated.

The clutch A is of commercial form and is therefore illustrated only in part. The driving member 17 carries a back plate or clutch housing 51 for mounting springs 52 thrusting driving pressure plate 53 toward driven member 25 and member 17. Plate 53 is unloaded to release clutch A in the usual manner by forward thrust of collar 54 acting through thrust bearing 55 and release levers 56. Collar 54 is mounted to slide on the forward end portion of a hollow sleeve 57 which is rigidly fixed by fasteners 58 to casing 12 so that sleeve 57 projects antilever-like from housing 12 where it derives its sole support. A clearance 59 is provided between shaft 11 and sleeve 57 and any form of sealing may be employed at 60 as long as it permits free tilt of shaft 11 within sleeve 57, such sealing preventing transmission grease from working into the housing of clutch A. In Fig. 1 the sealing 60 is in the form of a threaded groove such that rotation of shaft 11 tends to feed any grease back toward the transmission main bearing J. This bearing is of the anti-friction ball type and serves to journal the rear end of shaft 11 in casing 12. It will be observed that the clutch housing 51 has clearance at 61 with the thrust bearing assembly 55 so that housing 51 may tilt slightly with crankshaft 10 without binding at bearing 55.

In the assembly of the power transmitting system as thus far described, the crankshaft 10 drives through shrouding 15 to the clutch driving members 17 and 53. When clutch A is engaged, as illustrated, the drive then passes to driven clutch member 25 thence through hub 22 to impeller 30. From impeller 30 the drive is transmitted by the circulating oil in coupling B to runner 32 thence by hub 33 to shaft 11. To release shaft 11 from the crankshaft, the collar 54 is moved forwardly by any suitable means, thereby unloading pressure plate 53 and interrupting the drive between the crankshaft and the impeller 29 of coupling B. When clutch A is engaged, the driving torque is transmitted through the coupling to shaft 11 with the aforesaid advantages.

In actual practice, especially in ordinary production of modern motor vehicles, it is impossible as a practical matter to hold the axes of the shafts 10 and 11 exactly coaxial. Manufacturing tolerances must be allowed such that shaft 11 may tilt slightly relative to shaft 10 and one difficulty in employing a clutch and fluid coupling system of the type illustrated lies in the tendency of the parts to bind, wear, and leak oil because of the variations unavoidably introduced when the transmission is assembled with the drive system. I have provided an arrangement which compenates for the variations and is free from undesired characteristics otherwise present.

In my driving system, the shaft 11 is free to assume a tilt relative to shaft 10, the bearings E and J freely acting with universal action to compensate without binding for any misalignment between shaft 10 and the transmission. It is therefore necessary, in order to realize free tilting action of shaft 11, that the various parts moving with shafts 10 and 11 have freedom of relative movement in the radial or transverse direction. Ordinarily and for purposes of example, it may be assumed that the rear end of shaft 11 will vary within about .015 of an inch from a position truly concentric with shaft 10, the clearance 59 being adequate to freely accommodate such misalignment without binding between sleeve 57 and shaft 11. The degree of misalignment forwardly of shaft 11 will of course diminish as shaft 11 approaches bearing E and therefore clearance 27 need not be as great as clearance 59. When shaft 11 thus tilts slightly, the runner 32 remains on the same rotational axis with shaft 11 and is not thereby unbalanced; also, as the runner is mounted closely adjacent bearing E, the tilting movement of the runner is extremely small even with the maximum variation at the rear end of shaft 11.

If the crankshaft 10 is regarded as tilting slightly about bearing E relative to shaft 11 the result is the same, clearance 61 allowing such variation whereby parts 15, 17 and 51 are displaced as a unit.

Inasmuch as slight tilt of shaft 11 influences the hollow hub 22 by reason of bearing D, my arrangement is such as to relieve binding and maintain the impeller in running balance. Thus, the impeller 29 is free to tilt within shrouding 15 about bearing c which, in effect, is a crankshaft-carried bearing. Bearing c provides universal tilt for hub 22 and impeller 29, the clearance 27 being adequate to allow relative inclination between the axes of shaft 11 and hub 22. Thus if shaft 11 assumes a slight tilt, the forward end of hub 22 will be displaced so as to tilt hub 22 about bearing C but the impeller 29 and hub 22 retain their running balance about the axis of hub 22. It is not necessary to provide any special lost-motion for disk 25 to compensate for the slight relative movement between parts 17 and 22 because this disk is inherently sufficiently flexible, along with freedom to slide at the friction clutch faces 62, 63, so that binding will not result. The seals G and H will, of course, freely adjust themselves at all times to function in fluid-tight fashion.

It will be noted that the loads are taken efficiently by the various main bearings. For example, bearing E not only functions as aforesaid but also takes the end thrust of runner 32 and largely supports hub 33 radially; provides radial support for the front end of shaft 11 thereby supporting much of the load on impeller 29 transmitted through bearing D. Bearing C likewise takes the thrust on impeller 29 and supports clutch disk 25 and some of the radial load of the impeller. The residual radial loads on shaft 11 are, of course, taken by bearing J. While the forward end of the hollow hub 33 and shaft 11 may, if preferred, be rotatably supported directly by crankshaft 10, I find it more expedient to support this hub and shaft through the medium of the support member 10 but in either instance these parts are journalled on the crankshaft as is also the rear end of hub 22 through shrouding 15 and bearing C. With my arrangement it will be noted that the impeller 29 and runner 32 are axially fixed against endwise movement relative to each other and relative to shafts 10 and 11. In Fig. 1 the change speed transmission in housing 12 may receive a drive from the main pinion 64 formed on the rear end of shaft 11.

All references to location terminology in my specification and claims is employed in a sense of relative relationship of parts and not by way of limitation as obviously the drive system could, for example, be turned sideways or end-for-end relative to the vehicle. Therefore while the clutch A is shown "rearward" of coupling B and shaft 10, for example, such terminology is employed in a relative sense only.

The interior of shrouding 15 presents a chamber 65 which is, of course, open to the fluid circuit of the coupling, the bellows type sealing assembly H operating to prevent fluid escape rearwardly of shrouding 15, the plug 36 preventing fluid escape from the forward part of chamber 65. Although ordinarily the fasteners 13 will prevent fluid escape between shaft 10 and member 14, I have provided a sealing member 66 which closely fits within member 14 and against the rear end of the crankshaft to further insure a fluid seal at the crankshaft. Fasteners 13 hold parts 14, E and 66 in assembled relationship with the crankshaft by reason of the flange 67 on member 14.

It will be appreciated that I have not attempted to show the clearances at 27 and 59, for example, to true scale. Furthermore these clearances may vary according to manufacturing requirements within keeping of the broad teachings of my invention.

I claim:

1. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween; a clutch disposed rearwardly of said coupling and comprising driving and driven clutching structures; a shrouding for said coupling secured to said driving shaft and driving clutching structure; means comprising a hollow hub surrounding said driven shaft for drivingly connecting said driven clutching structure with said impeller structure; means for drivingly connecting said runner structure with said driven shaft; and means journalling said hollow hub within said shrouding, said journalling means being so constructed and arranged as to accommodate limited tilt of said hollow hub and impeller structure as a unit with respect to the axis of said driving shaft.

2. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween; a clutch disposed rearwardly of said coupling and comprising driving and driven clutching structures; a shrouding for said coupling secured to said driving shaft and driving clutching structure; means comprising an anti-friction bearing journalling said runner structure on said crankshaft, said bearing acting to prevent displacement of said runner structure relative to, and in a direction axially of, said driving shaft while accommodating tilt of said driven shaft and runner structure as a unit with respect to the axis of said driving shaft; means comprising a hollow hub surrounding said driven shaft for drivingly connecting said runner structure with said driven shaft; means drivingly connecting said driven clutching structure with said impeller structure; and means journalling said hollow hub within said shrouding, said journalling means being so constructed and arranged as to accommodate limited tilt of said hollow hub and impeller structure as a unit with respect to the axis of said driving shaft.

3. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween; a clutch disposed rearwardly of said coupling and comprising driving and driven clutching structures; a shrouding for said coupling secured to said driving shaft and driving clutching structure; means comprising an anti-friction bearing journalling said runner structure on said crankshaft, said bearing acting to prevent displacement of said runner structure relative to, and in a direction axially of, said driving shaft while accommodating tilt of said driven shaft and runner structure as a unit with respect to the axis of said driving shaft; means comprising a hollow hub surrounding said driven shaft for drivingly connecting said runner structure with said driven shaft; means drivingly connecting said driven clutching structure with said impeller structure; and means comprising a second anti-friction bearing journalling said hollow hub within said shrouding and acting to prevent displacement of said impeller structure relative to, and in a direction axially of, said driving shaft; said second bearing being so constructed and arranged as to accommodate limited tilt of said hollow hub and impeller structure as a unit with respect to the axis of said driving shaft.

4. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween; a clutch disposed rearwardly of said coupling and comprising driving and driven clutching structures; a shrouding for said coupling secured to said driving shaft and driving clutching structure; means comprising a hollow shaft drivingly connecting said impeller and driven clutching structures; a ball bearing assembly journalling said hollow shaft in said shrouding and adapted to accommodate tilt of said hollow shaft and impeller about the balls of said ball bearing assembly; means drivingly connecting said runner structure with said driven shaft; and means preventing displacement of said impeller and runner structures axially of and relative to said driving shaft.

5. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween; a clutch disposed rearwardly of said coupling and comprising driving and driven clutching structures; driving clutching structure; said coupling secured to said driving shaft and driving clutching structure; a shrouding bridging said coupling in spaced relation with said impeller and runner structures and serving to drivingly connect said driving shaft with said driving clutching structure; a hollow shaft surrounding said driven structure and drivingly connecting said driven clutching structure with said impeller structure; means drivingly connecting said runner structure with said driven shaft; and a ball bearing assembly journalling said hollow shaft within said shrouding between said impeller and driven clutching structure, said bearing assembly being so constructed and arranged as to accommodate tilt of said hollow shaft in said shrouding.

6. In a motor vehicle power transmission system having a driving shaft and a driven shaft disposed rearwardly of the driving shaft and adapted to drive the vehicle; a fluid coupling having impeller and runner structures providing a fluid drive-transmission circuit therebetween, said runner structure having a hollow hub surrounding and drivingly connected with said driven shaft; a bearing of the anti-friction ball type carried by said driving shaft and journalling the forward end of said hub; a relatively stationarily mounted support; a second bearing of the anti-friction ball type carried by said stationary support and journalling the rear end of said driven shaft; a clutch disposed at the rear of said coupling, said clutch comprising driving and driven clutching structures; shrouding means for said coupling drivingly connecting said driving shaft with said driving clutching structure; a hollow shaft surrounding said driven shaft and drivingly connecting said driven clutching structure with said impeller structure; a third bearing of the anti-friction ball type journalling said hollow shaft within said shrouding means; a fourth bearing of the anti-friction type journalling one end portion of said hollow shaft on said driven shaft, with the remaining portion of said hollow shaft having clearance with said driven shaft; said first and second bearings providing the entire support for said driven shaft and said runner structure and said clearance cooperating with these bearings so as to accommodate limited universal tilting of said driven shaft together with said runner structure as a unit relative to said driving shaft and shrouding means to compensate for minor misalignment between said driving shaft and said second bearing; said third bearing having the balls thereof disposed in a plane so as to accommodate tilt of said hollow shaft and impeller structure about these balls.

7. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween, said runner structure having a hollow hub surrounding and drivingly connected with said driven shaft; a bearing of the anti-friction ball type carried by said driving shaft and journalling the forward end of said hub; a relatively stationarily mounted support; a second bearing of the anti-friction ball type carried by said stationary support and journalling the rear end of said driven shaft; a clutch disposed at the rear of said coupling, said clutch comprising driving and driven clutching structures; shrouding means for said coupling drivingly connecting said driving shaft with said driving clutching structure; a hollow shaft surrounding said driven shaft and drivingly connecting said driven clutching structure with said impeller structure, said hollow shaft having at least a portion thereof spaced by clearance from said driven shaft; a single ball bearing assembly journalling said hollow shaft in said shrouding said first and second bearings providing the entire support for said driven shaft and said runner structure and said clearance cooperating with these bearings so as to accommodate limited universal tilting of said driven shaft together with said runner structure as a unit relative to said driving shaft and shrouding means to compensate for minor misalignment between said driving shaft and said second bearing.

8. In a motor vehicle power transmission system having a driving shaft and a driven shaft disposed rearwardly of the driving shaft and adapted to drive the vehicle; a fluid coupling having impeller and runner structures providing a fluid drive-transmitting circuit therebetween, said runner structure having a hollow hub surrounding and drivingly connected with said driven shaft; a bearing of the anti-friction ball type carried by said driving shaft and journalling the forward end of said hub; a relatively stationarily mounted support; a second bearing of the anti-friction ball type carried by said stationary support and journalling the rear end of said driven shaft; a clutch disposed at the rear of said coupling, said clutch comprising driving and driven clutching structures; shrouding means for said coupling drivingly connecting said driving shaft with said driving clutching structure; a hollow shaft surrounding said driven shaft and drivingly connecting said driven clutching structure with said impeller structure, said hollow shaft having at least a portion thereof spaced by clearance from said driven shaft; a third bearing of the anti-friction ball type journalling said hollow shaft within said shrouding means and cooperating with said clearance to accommodate limited universal tilting of said hollow shaft and said impeller as a unit relative to said driving and driven shafts; said first and second bearings providing the entire support for said driven shaft and said runner structure and said clearance cooperating with these bearings so as to accommodate limited universal tilting of said driven shaft together with said runner structure as a unit relative to said driving shaft and shrouding means to compensate for minor misalignment between said driving shaft and said second bearing.

9. In a power transmitting system; a driving shaft; a driven shaft; means journalling one end of said driven shaft on said driving shaft to accommodate free universal tilt of said driven shaft relative to said driving shaft to compensate for misalignment of said shafts; a relatively stationarily mounted support; means journalling the other end of said driven shaft on said support to freely accommodate said tilt of said driven shaft; clutching means comprising driving and driven clutching structures; a fluid drive-transmitting device comprising impeller and runner structures cooperable with each other to provide a fluid drive-transmitting circuit therebetween; means bridging said device for drivingly connecting said driving shaft with said driving clutch structure; means drivingly connecting said runner structure with said driven shaft; means drivingly connecting said driven clutching structure with said impeller structure; and means journalling the last said drivingly-connecting-means on said bridging means so constructed and arranged as to accommodate universal tilt of said impeller structure relative to said bridging means.

10. In a power transmitting system; a driving shaft; a driven shaft; means journalling one end of said driven shaft on said driving shaft to accommodate free universal tilt of said driven shaft relative to said driving shaft to compensate for misalignment of said shafts; a relatively stationarily mounted support; means journalling the other end of said driven shaft on said support to freely accommodate said tilt of said driven shaft; clutching means comprising and driven clutching structures; a fluid drive-transmitting device comprising impeller and runner structures cooperable with each other to provide a fluid drive-transmitting circuit therebetween; means bridging said device for drivingly connecting said driving shaft with said driving clutch structure; means drivingly connecting said runner structure with said driven shaft; means drivingly connecting said driven clutching structure with said impeller structure; and means journalling the last said drivingly-connecting-means on said driven shaft and on said bridging means so constructed and arranged as to accommodate universal tilt of said impeller structure relative to said bridging means.

11. In a power transmitting system; a driving shaft; a driven shaft; means journalling one end of said driven shaft on said driving shaft to accommodate free universal tilt of said driven shaft relative to said driving shaft to compensate for misalignment of said shafts; a relatively stationarily mounted support; means journalling the other end of said driven shaft on said support to freely accommodate said tilt of said driven shaft; clutching means comprising driving and driven clutching structures; a fluid drive-transmitting device comprising impeller and runner structures cooperable with each other to provide a fluid drive-transmitting circuit therebetween; means bridging said device for drivingly connecting said driving shaft with said driving clutch structure; means drivingly connecting said runner structure with said driven shaft; a hollow shaft surrounding said driven shaft, said hollow shaft having connection adjacent one end thereof with said driven clutching structure and adjacent the other end thereof with said impeller structure; and means journalling said hollow shaft on said bridging means for universal tilting of said hollow shaft relative to said bridging means and being disposed at a region along said hollow shaft which is spaced intermediate said connections between said hollow shaft and said driven clutch and impeller structures.

12. In a power transmitting system; a driving shaft; a driven shaft; means journalling one end of said driven shaft on said driving shaft to accommodate free universal tilt of said driven shaft relative to said driving shaft to compensate for misalignment of said shafts; a relatively stationarily mounted support; means journalling the other end of said driven shaft on said support to freely accommodate said tilt of said driven shaft; clutching means comprising driving and driven clutching structures; a fluid drive-transmitting device comprising impeller and runner structures cooperable with each other to provide a fluid drive-transmitting circuit therebetween; means bridging said device for drivingly connecting said driving shaft with said driving clutch structure; means drivingly connecting said runner structure with said driven shaft; a hollow shaft surrounding said driven shaft, said hollow shaft having connection adjacent one end thereof with said driven clutching structure and adjacent the other end thereof with said impeller structure; means journalling a portion of said hollow shaft on said driven shaft adjacent said connection between said hollow shaft and said impeller structure, remaining portions of said hollow shaft having clearance with said driven shaft sufficient to accommodate said tilt of said driven shaft relative to said hollow shaft; means journalling said hollow shaft on said bridging means at a region along said hollow shaft which is spaced intermediate said connections between said hollow shaft and said driven clutch and impeller structures, this journalling means being so constructed and arranged as to freely accommodate universal tilt of said hollow shaft about this journalling means by reason of said tilt of said driven shaft acting through the first said hollow-shaft-journalling-means to tilt said hollow shaft.

GEORGE J. HUEBNER, JR.

CERTIFICATE OF CORRECTION.

Patent No. 2,296,642.  September 22, 1942.

GEORGE J. HUEBNER, JR.

It is hereby certified that error appears in the printed specification of the above numbered patent requiring correction as follows: Page 3, second column, lines 57 and 58, claim 2, strike out "comprising a hollow hub surrounding said driven shaft for" and insert the same before "drivingly" in line 60, same claim; page 4, first column, lines 10 and 11, claim 3, strike out "comprising a hollow hub surrounding said driven shaft for" and insert the same before "drivingly" in line 13, same claim; lines 53 to 55 inclusive, strike out "driving clutching structure; said coupling secured to said driving shaft and driving clutching structure;"; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.